(12) United States Patent
Yersak et al.

(10) Patent No.: US 10,680,281 B2
(45) Date of Patent: Jun. 9, 2020

(54) SULFIDE AND OXY-SULFIDE GLASS AND GLASS-CERAMIC FILMS FOR BATTERIES INCORPORATING METALLIC ANODES

(71) Applicant: GM GLOBAL TECHNOLOGY OPERATIONS LLC, Detroit, MI (US)

(72) Inventors: Thomas A. Yersak, Ferndale, MI (US); James R. Salvador, Royal Oak, MI (US); Han Nguyen, San Diego, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 311 days.

(21) Appl. No.: 15/480,505

(22) Filed: Apr. 6, 2017

(65) Prior Publication Data

US 2018/0294517 A1 Oct. 11, 2018

(51) Int. Cl.
*H01M 10/0562* (2010.01)
*C03C 3/32* (2006.01)
*C03C 10/00* (2006.01)
*C03C 4/18* (2006.01)
*C03B 25/02* (2006.01)
(Continued)

(52) U.S. Cl.
CPC ....... *H01M 10/0562* (2013.01); *C03B 17/062* (2013.01); *C03B 19/09* (2013.01); *C03B 25/025* (2013.01); *C03B 32/02* (2013.01); *C03C 3/321* (2013.01); *C03C 4/18* (2013.01); *C03C 10/00* (2013.01); *C03B 2201/86* (2013.01);
(Continued)

(58) Field of Classification Search
None
See application file for complete search history.

(56) References Cited

U.S. PATENT DOCUMENTS 5,049,335 A 9/1991 Kuji et al.
5,415,959 A 5/1995 Pyszczek et al.
(Continued)

FOREIGN PATENT DOCUMENTS

CN 109119683 A 1/2019
DE 102018115009 A1 12/2018
(Continued)

OTHER PUBLICATIONS

Yersak, Thomas et al., U.S. Appl. No. 15/992,878, filed May 30, 2018 entitled, "Methods of Manufacturing High-Active-Material-Loading Composite Electrodes and All-Solid-State Atteries Including Composite Electrodes," 55 pages.
(Continued)

*Primary Examiner* — Jonathan G Leong
*Assistant Examiner* — Kirsten B Tysl
(74) *Attorney, Agent, or Firm* — Harness, Dickey & Pierce, P.L.C.

(57) ABSTRACT

Thin amorphous or partially crystalline lithium-containing and conducting sulfide or oxysulfide glass electrode/separator members are prepared from a layer of molten glass or of glass powder. The resulting glass films are formed to lie face-to face against a lithium metal anode or a sodium metal anode and a cathode and to provide for good transport of lithium ions between the electrodes during repeated cycling of the cell and to prevent shorting of the cell by dendrites growing from the lithium metal or sodium metal anode.

20 Claims, 2 Drawing Sheets (51) Int. Cl.
  *C03B 19/09*    (2006.01)
  *C03B 17/06*    (2006.01)
  *C03B 32/02*    (2006.01)
  *H01M 10/052*   (2010.01)

(52) U.S. Cl.
  CPC .. *H01M 10/052* (2013.01); *H01M 2300/0068* (2013.01); *H01M 2300/0071* (2013.01)

(56) References Cited

U.S. PATENT DOCUMENTS

| | | | |
|---|---|---|---|
| 6,207,891 B1* | 3/2001 | Hall | H01L 31/182 |
| | | | 136/255 |
| 8,974,946 B2 | 3/2015 | Cai et al. | |
| 9,123,939 B2 | 9/2015 | Xiao et al. | |
| 9,160,036 B2 | 10/2015 | Yang et al. | |
| 9,252,411 B2 | 2/2016 | Abd Elhamid et al. | |
| 9,302,914 B2 | 4/2016 | Liu et al. | |
| 9,362,552 B2 | 6/2016 | Sohn et al. | |
| 9,373,829 B2 | 6/2016 | Xiao et al. | |
| 9,437,871 B2 | 9/2016 | Zhou et al. | |
| 9,537,144 B2 | 1/2017 | Huang et al. | |
| 9,647,254 B2 | 5/2017 | Dadheech et al. | |
| 9,742,028 B2 | 8/2017 | Zhou et al. | |
| 9,896,763 B2 | 2/2018 | Dadheech et al. | |
| 9,905,847 B2 | 2/2018 | Dadheech et al. | |
| 9,923,189 B2 | 3/2018 | Xiao | |
| 9,929,435 B2 | 3/2018 | Cai et al. | |
| 9,966,630 B2* | 5/2018 | Cheng | C04B 35/4885 |
| 9,979,008 B2 | 5/2018 | Dai et al. | |
| 9,985,284 B2 | 5/2018 | Dadheech et al. | |
| 10,084,204 B2 | 9/2018 | Dai et al. | |
| 10,116,001 B2* | 10/2018 | Chen | H01M 10/0525 |
| 10,128,481 B2 | 11/2018 | Xiao et al. | |
| 10,141,559 B2 | 11/2018 | Xiao et al. | |
| 10,199,643 B2 | 2/2019 | Zhou et al. | |
| 10,312,501 B2 | 6/2019 | Yang et al. | |
| 10,326,166 B2 | 6/2019 | Yang et al. | |
| 10,367,201 B2 | 7/2019 | Yang et al. | |
| 10,381,170 B2 | 8/2019 | Dai et al. | |
| 10,431,849 B2 | 10/2019 | Yesrak et al. | |
| 2011/0027627 A1 | 2/2011 | Deane et al. | |
| 2014/0315103 A1* | 10/2014 | Higuchi | H01B 1/06 |
| | | | 429/322 |
| 2015/0056387 A1 | 2/2015 | Dadheech et al. | |
| 2015/0056493 A1 | 2/2015 | Dadheech et al. | |
| 2015/0056507 A1 | 2/2015 | Dadheech et al. | |
| 2015/0099190 A1* | 4/2015 | Holme | H01M 10/0525 |
| | | | 429/322 |
| 2015/0236324 A1 | 8/2015 | Xiao et al. | |
| 2015/0349307 A1 | 12/2015 | Dadheech et al. | |
| 2016/0017271 A1 | 1/2016 | Nozaki et al. | |
| 2016/0020491 A1 | 1/2016 | Dai et al. | |
| 2016/0028104 A1* | 1/2016 | Liang | H01M 10/0525 |
| | | | 429/323 |
| 2016/0111721 A1 | 4/2016 | Xiao et al. | |
| 2016/0141598 A1 | 5/2016 | Dai et al. | |
| 2016/0156065 A1* | 6/2016 | Visco | H01M 10/0562 |
| | | | 429/322 |
| 2016/0172665 A1 | 6/2016 | Zhou et al. | |
| 2016/0172681 A1 | 6/2016 | Yang et al. | |
| 2016/0172706 A1 | 6/2016 | Xiao et al. | |
| 2016/0172710 A1 | 6/2016 | Liu et al. | |
| 2016/0218342 A1 | 7/2016 | Xiao et al. | |
| 2017/0141382 A1 | 5/2017 | Dadheech et al. | |
| 2017/0162859 A1 | 6/2017 | Yang et al. | |
| 2017/0214079 A1 | 7/2017 | Dai et al. | |
| 2017/0271678 A1 | 9/2017 | Yang et al. | |
| 2017/0288230 A1 | 10/2017 | Yang et al. | |
| 2017/0338490 A1 | 11/2017 | Xiao et al. | |
| 2018/0048022 A1 | 2/2018 | Yang et al. | |
| 2018/0083303 A1 | 3/2018 | Platt et al. | |
| 2018/0287207 A1 | 10/2018 | Dai et al. | |
| 2018/0294517 A1 | 10/2018 | Yersak et al. | |
| 2018/0309165 A1 | 10/2018 | Yersak et al. | |
| 2018/0309166 A1 | 10/2018 | Yersak et al. | |
| 2018/0375148 A1 | 12/2018 | Yersak et al. | |

FOREIGN PATENT DOCUMENTS

| | | |
|---|---|---|
| WO | 2014182281 A1 | 11/2014 |
| WO | 2016089897 A1 | 6/2016 |
| WO | 2016089899 A1 | 6/2016 |
| WO | 2017045573 A1 | 3/2017 |

OTHER PUBLICATIONS

Yersak, Thomas et al., U.S. Appl. No. 16/164,525, filed Oct. 18, 2018 entitled, "Low-Expansion Composite Electrodes for All-Solid-State Batteries," 53 pages.

Ahmed, Shabbir et al., "Study of a dry room in a battery manufacturing plant using a process model," Journal of Power Sources, 326 (20160, pp. 490-497 (Published online Jul. 15, 2016); DOI: 10.1016/j.jpowsour.2016.06.107.

Fornell, J. et al., "Enhanced mechanical properties due to structural changes induced by devitrification in Fe—Co—B—Si—Nb bulk metallic glass," Acta Materialia 58 (2010), pp. 6256-6266; DOI: 10.1016/j.actamat.2010.07.047.

Hayashi, Akitoshi et al., "Improved chemical stability and cyclability in Li2S—P2S5—P2O5—ZnO composite electrolytes for all-solid-state rechargeable lithium batteries," Jouranl of Alloys and Compounds, 591 (2014), pp. 247-250 (Published online Jan. 2, 2014); DOI: 10.1016/j.jallcom.2013.12.191.

Ito, Seitaro et al., "A rocking chair type all-solid-state lithium ion battery adopting Li2O—ZrO2 coated LiNi0.8Co0.15Al0.05O2 and a sulfide based electrolyte"; Journal of Power Sources (2014), 248, pp. 943-950.

Kato, Yuki et al., "High power all-solid-state batteries using suplhide superionic conductors"; Nature Energy , 1, Article No. 16030 (2016) doi:10.1038/nenergy.2016.30.

Kim, Youngsik et al., "Anomalous Ionic Conductivity Increase in Li2S + GeS2 + GeO2 Glasses," J. Phys. Chem. B (2006) 110, pp. 16318-16325; DOI: 10.1021/jp060670c.

Nam, Young Jin et al., "Bendable and Thin Sulfide Solid Electrolyte Film: A New Electrolyte Opportunity for Free-Standing and Stackable High-Energy All-Solid-State Lithium-Ion Batteries"; Nano Lett (2015), 15, pp. 3317-3323; DOI: 10.1021/acs.nanolett. 5b00538.

Ohtomo, Takamasa et al., "All-solid-state batteries with Li2O—Li2S—P2S5 glass electrolytes synthesized by two-step mechanical milling," J. Solid State Electrochem, 17 (10), pp. 2551-2557 (Published online Jun. 13, 2013); DOI: 10.1007/s10008-013-2149-5 (Abstract only).

Ohtomo, Takamasa et al., "Glass Electrolytes with High Ion Conductivity and High Chemical Stability in the System LiI—Li2O—Li2S—P2S5," Electrochemistry, 81 (6), pp. 428-431 (Published Jun. 5, 2013); DOI: 10.5796/electrochemistry.81.428.

Park, Mansoo et al., "Microscopic Analysis of High Lithium-Ion Conducting Glass-Ceramic Sulfides," Journal of the Korean Ceramic Society, vol. 53, No. 5, pp. 568-573 (2016); DOI: 10.4191/kcers. 2016.53.5.568.

Sakuda, Atsushi et al., "All-solid-state lithium secondary batteries using LiCoO2 particles with pulsed laser deposition coatings of Li2S—P2S5 solid electrolytes"; Journal of Power Sources (2011), 196, pp. 6735-6741.

Sharafi, Asma et al., "Characterizing the Li—Li7La3Zr2O12 interface stability and kinetics as a function of temperature and current density," Journal of Power Sources 302 (2016) pp. 135-139 (Published online: Oct. 27, 2015); DOI: 10.1016/j.jpowsour.2015.10. 053.

Tsukasaki, Hirofumi et al., "Crystallization behavior of the Li2S—P2S5 glass electrolyte in the LiNi1/3Mn1/3Co1/3O2 positive electrode layer"; Scientific Reports (2018), 8, 6214; DOI:10.1038/s41598-018-24524-7.

Whiteley, Justin et al., "Empowering the Lithium Metal Battery through a Silicon-Based Supertonic Conductor," Journal of the (56) References Cited

OTHER PUBLICATIONS

Electrochemical Society, 161 (12), pp. A1812-A1817 (Published Aug. 22, 2014); DOI: 10.1149/2.0501412jes.
Yersak, Thomas A. et al., eds. N Dudney et al., Handbook of Solid State Batteries; 2nd Edition. World Scientific (2016) Chapter 18, "Advancing Conversion Electrode Reversability with Bulk Solid-State Batteries"; pp. 627-655.

* cited by examiner

SULFIDE AND OXY-SULFIDE GLASS AND GLASS-CERAMIC FILMS FOR BATTERIES INCORPORATING METALLIC ANODES

TECHNICAL FIELD

Methods are provided for preparing sulfide and oxy-sulfide glass and glass-ceramic solid-state electrolytes for batteries having a metallic anode substantially consisting of lithium or sodium. Dense sulfur-containing glasses are prepared which enable the formation of energy dense metal anode batteries while preventing penetration of metallic dendrites into the solid-state electrolyte/separator.

INTRODUCTION

Lithium batteries are finding increasing use in automotive vehicles and many other consumer products and sodium batteries are receiving favorable consideration for such applications. Exemplary batteries may employ a lithium metal anode in combination with a suitable liquid or solid electrolyte and a compatible active cathode material. For example, lithium batteries utilizing lithium metal anodes could enable the formation of energy-dense lithium-lithium manganese oxide electrochemical cells, lithium-sulfur cells, and lithium-air cells.

In many lithium-metal batteries and proposed sodium-metal batteries it would be desirable to use a solid-state electrolyte (SSE) which could enable the transport of metal ions between the anode layer and cathode layer while also physically separating these electrodes. Some glass compositions which act as both an electrolyte and a separator have been proposed for use with lithium electrodes. Such glass compositions serve both to transport lithium ions and also form a physical barrier between the lithium anode and the rest of the cell components. Sulfide glasses have fair to excellent lithium ion conductivity but have been difficult to form as electrolyte/separator structures and have been vulnerable to cell failure due to penetration by lithium dendrites formed on and from the lithium anode during repeated cycling of the battery cell(s).

There remains a need for methods of forming thin sulfide-based or oxy-sulfide electrolyte films suitable for prolonged use in lithium metal electrochemical cells. The solid-state electrolyte must contribute to both suitable energy capacity of the cell and to mechanically prevent dendritic lithium shorting of the cell.

SUMMARY

Sulfide and oxy-sulfide glasses may be formed by combining three classes of materials: i) one or more glass formers, including, for example, $P_2S_5$, $SiS_2$, $GeS_2$, $SnS_2$, $P_2O_5$, $B_2O_3$, $SiO_2$, $Al_2O_3$; ii) one or more glass modifiers, including, for example, $Li_2S$, $Na_2S$, $Li_2O$, $Na_2O$, and; iii) one or more dopants, for improving glass formability and/or stability, including, for example, LiI, $Li_3PO_4$, $Li_4SiO_4$. It will be understood that the compositions associated with particular material classes are exemplary and neither limiting nor exclusionary.

For a sulfide glass both the glass former and the glass modifier will contain sulfur (e.g. $Li_2S$—$P_2S_5$). An oxy-sulfide glass may combine an oxide-forming system with a sulfide co-former (for example, and without limitation $Li_2O$—$P_2O_5$—$P_2S_5$) or a sulfide-forming system with an oxide co-former (for example, and without limitation $Li_2S$—$P_2S_5$—$P_2O_5$).

In the following description, at least one component must contain sulfur to support the intended electrolyte activity. Particularly, at least one of the glass formers must contain sulfur to be a sulfide or oxy-sulfide glass but the glass modifier, as noted in the above illustrative example may contain either sulfur or oxygen (in the above non-limiting examples, $Li_2S$, $Li_2O$)

These constituent precursors react to form a unique composition that enables the formation of mobile alkali metal cations. For convenience, any compositions detailed in subsequent sections will be described in terms of the atomic proportions of their constituents (for example, $70Li_2S$-$30P_2S_5$). These constituents, when processed, will however form a glass whose empirical composition is $Li_7P_3S_{11}$ which possesses a structure with mobile lithium ions and anchored phosphorus sulfide tetrahedral anion structural units ($PS_4^{3-}$).

The resulting sulfur-containing glass compositions achievable with suitable combinations of these constituents include, without limitation, lithium phosphorous (oxy)sulfide, lithium boron (oxy)sulfide, lithium boron phosphorous oxy-sulfide, lithium silicon (oxy)sulfide, lithium germanium (oxy)sulfide, lithium arsenic (oxy)sulfide, lithium selenium (oxy)sulfide, and lithium aluminum (oxy)sulfide, individually or in combination. The term (oxy)sulfide represents that both an oxygen-free sulfide composition or an oxygen-containing oxy-sulfide may be prepared.

An example of a suitable composition is $xLi_2S \cdot (100-x)P_2S_5$ where x has a value in the range of 50-90. The composition is formed by preparing a melt of dilithium sulfide and phosphorus pentasulfide at a temperature of about 700° C. The glass former and glass modifier interact to form a glassy composition containing mobile lithium ions. In an aspect, applicable to cells in which sodium ions are the conductive entities, disodium sulfide may appropriately be substituted for dilithium sulfide to form a sodium ion-conducting solid electrolyte. Such a sodium ion-conducting electrolyte may be prepared by following the steps described below for a lithium ion-conducting electrolyte with appropriate substitution of sodium-containing constituents for the recited lithium-containing constituents.

In an embodiment of the invention, an initial lithium-containing sulfide glass composition is in the form of small particles (a powder) having amorphous glassy microstructures. The particles are applied to a quartz substrate layer (or a like material resistant to moderate temperatures of less than about 350° C. and non-reactive with the glass particles) in a thin layer of generally uniform thickness and over an area predetermined for finished formation of the glass electrode/separator layers. The amorphous glass particles are then heated on, and consolidated against, the substrate to form a fully integral consolidated glass layer, 10 micrometers to 200 micrometers thick, still having a non-crystalline microstructure. The supported thin glass layer is then annealed to reduce any localized stresses induced in the consolidated microstructure and, if desired, to introduce small isolated crystal phases in the non-crystalline matrix.

The glass layer is carefully removed from the substrate and processed as necessary into individual lithium-conducting electrode/separator layers for assembly into lithium-based batteries utilizing a lithium metal anode layer. Generally, the as-fabricated glass layer thickness will be predetermined to be suitable for its intended battery use. But because it is intended that the width of the substrate will be greater than the dimension required of a battery electrolyte, and that, preferably, the fabrication process will be continuous, the fabricated thin glass layer sheet may need to be cut, sliced or otherwise apportioned into suitably-sized electrolyte portions.

The intention is to produce a thin, transparent to translucent, glass electrode/separator layer that can function cooperatively with a metallic lithium or sodium anode layer and efficiently accommodate the transport of lithium or sodium ions between the anode layer and an engaging, or nearby, cathode layer. Further, the thin glass layer remains resistant to penetration of metallic dendrites which may form on the anode during repeated cycling of the battery cell.

In a second embodiment, a melt of the interacted constituents is applied to a pre-heated, smooth flat surface of a smooth substrate. The substrate is selected to both be non-reactive by the melt and wettable by the melt so that the melt may freely spread across the substrate surface. A suitable substrate is quartz. The surface area of the substrate and the quantity of applied melt cooperate to form a molten layer of predetermined thickness of between 10 and 200 micrometers and corresponding to the intended thickness of the conductor/separator. The molten layer is then quickly cooled at a rate sufficient to render an amorphous solid as a thin glassy film or layer.

Following an annealing treatment to remove residual stresses and, optionally, partially crystallize the layer, the layer may be removed from its supporting substrate. Again, it is anticipated that the as-fabricated layer will be cut or otherwise sectioned into appropriately-sized portions suited for application as electrolytes in a battery or cell.

In an aspect, this melt-derived glass layer may be pulverized to form the glassy powder precursor for the powder-based process described in the first embodiment. Such pulverization may be practiced after the melt has been solidified or after the solidified melt has been annealed.

Other features of the disclosure will be apparent from the following detailed descriptions and illustrations which make reference to the drawing figures.

DETAILED DESCRIPTION

Sulfide-based or oxy-sulfide-based glasses containing lithium ions offer promise as solid electrolytes in electrochemical cells which employ an alkali metal, particularly lithium or sodium, as an anode. For convenience, the following description will detail methods for forming a thin layer of a lithium ion-conducting solid electrolyte for use in cells comprising a metallic lithium anode, but similar methods may be practiced to prepare sodium ion-conducting electrolytes by substituting sodium-based compositions for the corresponding lithium-based compositions.

Suitably thin films or sheets of these sulfide or oxy-sulfide compositions may be interposed between the lithium metal anode, possibly in conjunction with a liquid, lithium-conducting electrolyte, and an opposing cathode and serve to separate these opposing electrodes and prevent direct electrical interconnection of anode and cathode in such cells.

The separator function of the film is as important as its electrolytic properties since a lithium metal anode, initially of uniform thickness, develops local variation in thickness with successive discharge-charge cycles. These local thickness variations manifest themselves as dendrites, elongated, spear-like features which protrude from the bulk lithium metal layer and, if suitably extensive may bridge the gap between anode and cathode to produce a short circuit. Thus, the thin glass film should be suitably robust to mechanically obstruct such dendrites. In addition, the film should be resistant to chemical or metallurgical infiltration of lithium to prevent formation of a lithium metal 'bridge' through the electrolyte/separator which would likewise enable direct electrical interconnection of anode and cathode. Resistance to such chemical and metallurgical infiltration is conferred by the absence of grain boundaries in amorphous structures.

A wide range of sulfide and oxy-sulfide compositions may be employed, each incorporating a glass former and a lithium-containing glass modifier $Li_4SiO_4$, $Li_3PO_4$, lithium halides and their sodium-based counterparts are dopants which may be used to improve glass formability and/or stability as well as enhancing ionic conductivity. Suitable sulfide-based glass formers include $P_2S_5$, $GeS_2$, $SiS_2$, $As_2S_3$ and $SnS_2$ which may be combined with $Li_2S$ etc. As stated earlier, for a sulfide glass both the glass former and the glass modifier will contain sulfur (e.g. $Li_2S$—$P_2S_5$). For an oxy-sulfide glass it will either be an oxide-forming system with a sulfide co-former (e.g. $Li_2O$—$P_2S_5$—$P_2O_5$) or a sulfide-forming system with an oxide co-former (e.g. $Li_2S$—$P_2S_5$—$P_2O_5$).

An exemplary, but non-limiting glass-forming system may be based on $P_2S_5$ (diphosphorus pentasulfide) as the glass former and $Li_2S$ (dilithium sulfide) as the glass modifier. Of course, $Li_2S$ also serves to contribute the $Li^+$ lithium ions to the resulting glass and impart the desired lithium ion conductivity to the glass. A wide range of proportions of these constituents may yield suitable glasses. One exemplary, but non-limiting, composition is $70Li_2S.30P_2S_5$.

As noted, a major consequence of the relative proportions of the glass former and the lithium-containing glass modifier is to vary the concentration of $Li^+$ lithium ions in, and consequently the conductivity of, the resulting glass. In addition, the viscosity of the resulting glass and fluidity of the glass melt are also affected by the relative concentration of glass former and modifier, or equivalently, by the glass composition with processing consequences which will be covered below.

Figure 1:
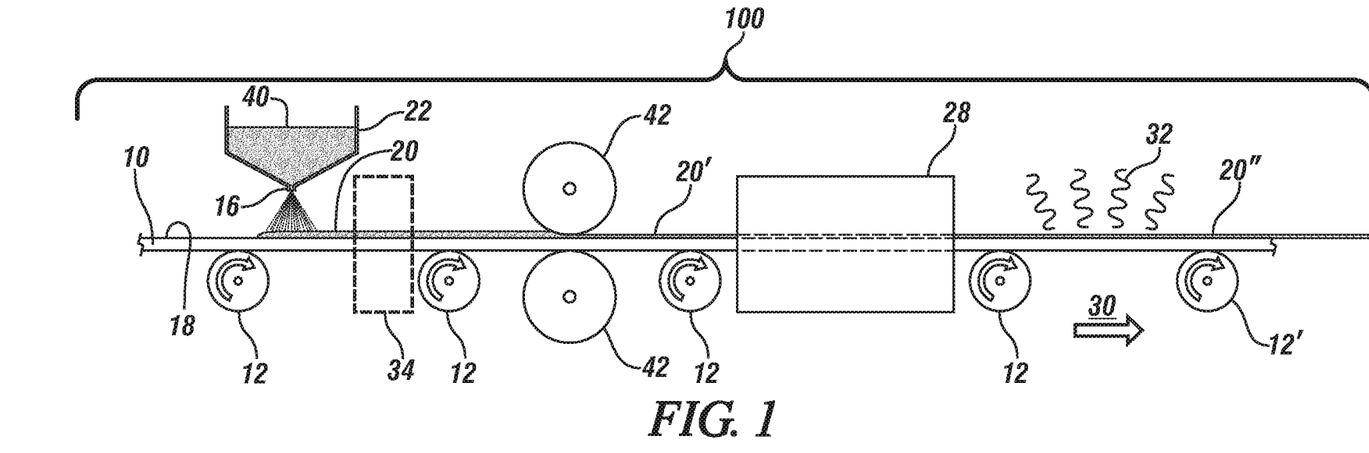
FIG. 1 illustrates a process for forming a compacted lithium-containing sulfide or oxy-sulfide glass film from sulfide or oxy-sulfide powder. The process may be conducted as a continuous process.

Suitable exemplary methods for fabrication of thin glass films from a glassy powder precursor are described below in conjunction with FIGS. 1 and 3. FIG. 1 illustrates a process which employs, as its starting material, previously-prepared glassy powders with the composition of the intended thin glass film while FIG. 3 illustrates a process which employs a melt of the intended glass film composition. The process of FIG. 3 may also be used as a high-throughput process for preparing 'bulk' glassy layers which may be pulverized to prepare powders, suitable for the process of FIG. 1, of the glassy films. FIG. 2 illustrates the microstructural evolution occurring during the powder process illustrated in FIG. 1.

FIG. 1 details a continuous process for preparing continuous lengths of such thin glass films which would subsequently be cut or otherwise fragmented into a plurality of discrete conductor sheets suitably sized for the electrochemical cell in which they are to be incorporated. However, those of skill in the art will appreciate that such a continuous process may readily be adapted to be conducted as a batch process, in which the individual steps may be conducted independently of one another and/or asynchronously to prepare a plurality of individual conductor sheets, not necessarily pre-sized for the electrochemical cell. For example, the processing steps may be performed at a series of individual stations with the in-process conductor sheets transported from station-to-station by pick-and-place automation, robots, conveyor belts or other suitable equipment.

In an embodiment as shown at FIG. 1, the thin glassy films are fabricated on a substrate, a portion 10 of which is shown. Substrate portion 10 is carried on, and advances in, the direction of arrow 30 by the action of rollers 12, 12'. Substrate portion 10 may be a portion of a continuous belt which, at roller 12' loops under (not shown) substrate portion 10 and is carried in a direction opposite that of arrow 30 from roller 12' to roller 12 until it loops upwardly (not shown) at roller 12 to again participate in the process to be described. Alternatively, substrate 10 may be a portion of a large diameter annular disc which is supported and carried on radially oriented rollers 12 continually advancing in a single direction until a surface portion of substrate 10 completes a full revolution and returns to its starting point ready for re-use. It will be further appreciated that, in operation of such a continuous device there may be need for cleaning or surface treatment stations (not shown) to restore the substrate surface to a suitable condition for re-use. These features and characteristics are not illustrated and the following description will focus primarily on the sequence of fabrication steps occurring in fabrication zone 100 on substrate portion 10 as substrate portion 10 traverses the fabrication zone.

Substrate portion 10, with a smooth surface 18, is advanced by support rollers 12, 12' in the direction of arrow 30 so that it is progressively carried into fabrication zone 100. As will be described more fully below, the material of substrate portion 110 is subjected to a range of temperatures that generally do not exceed 350° C. Accordingly, a wide range of materials may be considered for use as a substrate. Generally, the choice of substrate material should be informed by the requirement that it exhibit suitable structural strength at the maximum temperature of interest, and that it be non-reactive with the sulfide/oxy-sulfide glass powder. Exemplary materials include quartz, stainless steels, and generally, metals and alloys with melting points of 1000° C. or greater. In some applications, it may be feasible to use a high temperature, possibly reinforced polymer such as polytetrafluoroethylene (Teflon) or polyetheretherketone (PEEK).

As substrate portion 10 advances, it passes below hopper 22 containing particles of solid glassy materials 40 and dispensing nozzle 16, both of which cooperate to apply, by gravity, glass powder 40, as a substantially uniformly thick powder layer 20, to the surface 18 of substrate portion 10. Although a single hopper 22 and nozzle 16 are shown, it may be appropriate to employ multiple dispensing nozzles 16, fed by a single or multiple hoppers 22 to more uniformly apply powder layer 20 to the full width of substrate portion 10. Those of skill in the art will appreciate that various additional pieces of conventional equipment such as screw conveyers, vibratory screens etc. (not shown) may be employed to assure a uniform and continuous flow of such particulate matter.

Similarly, to achieve a generally uniform distribution and thickness of the powder particles on substrate portion 10 a device such as a doctor blade (not shown) or a vibratory exciter (not shown) may be used to more completely level the applied powder and render a generally uniform powder layer 20 downstream of hopper 22. Although not shown, it will be appreciated that powder may also be applied as a paste containing a volatile solvent that may be evaporated after deposition, by spray deposition, by electrostatic deposition or any other suitable means known to those of skill in the art.

Suitable solid glassy particles may be formed, for example by ball milling a bulk, solid glassy material. Bulk glassy material prepared by any suitable method including the process illustrated in FIG. 3 which will be described later, or from batch processed material. The powder preferably includes particles from a large number of size ranges to enable more complete packing of the power particles but the maximum particle size should be limited to no more than 15% of the thickness of powder layer 20.

It is intended that powder layer 20 be heated and compacted to form fully dense glassy layer 20'. Compaction may be effected by passing powder layer 20 between opposed, heated rollers 42. In an aspect, powder layer 20 may optionally be preheated in an oven or furnace 34 (shown in ghost), or, rollers 42 may serve to both heat and compact the particles. For simplicity, only one set of rollers 42 is illustrated but a series of such heated rollers, each applying a predetermined degree of compaction until full or near-full density is achieved, may be employed. Of course, full density is most readily achieved when the packing fraction of powder layer 20 is highest, which, as noted, is promoted by accepting a wide range of a particle sizes, including fines, in powder 40. The term full density is intended to encompass a compacted body containing up to 15% residual porosity.

Suitable time-temperature-pressure combinations to achieve full density are related to the viscosity of the glass which must be sufficiently low that the glassy particles will flow under pressure, rather than fracturing. Hence, the glass be maintained above its Tg, its glass transition temperature. Typically, the viscosity of liquids, and supercooled amorphous alloys, will decrease with increasing temperature suggesting that increased temperature will be beneficial. However, to maintain the glassy layer in a compactable but fully amorphous state, the compaction temperature may not exceed $T_c$, the crystallization temperature of the selected glass composition. Also, for production efficiency, the compaction time, or the time spent by powder layer 20 between the gap of rolls 42 cannot be excessive. Suitably the compaction temperature should be selected to be about 40° C. above $T_g$ but below $T_c$ both of which temperatures will vary with glass composition. Glasses compacted in this temperature range may be compacted in about 5-3600 seconds under a pressure of 0.1 to 360 MPa. Some suitable glass compositions include $xLi_2S \cdot (100-x-y)P_2S_5 \cdot yP_2O_5$ (x=50-90 and y=0-20) and which exhibit a $T_g$ of between 210° C. and 220° C. and a $T_c$ of between 220° C. and 280° C.

After compaction, compacted glassy layer 20' will exhibit internal stress(es) which, if not relieved may promote spontaneous fracture and fragmentation of the glassy sheet. To relieve the resulting internal stress, compacted glassy layer 20' passes through annealing furnace 28. The annealing time and temperature may be selected to relieve internal stresses while retaining either an amorphous microstructure or a partially crystallized microstructure. When a fully amorphous or glassy layer is desired, the annealing temperature should be maintained above Tg but below Tc to render a glassy layer 20" substantially free of internal stresses. As long as the temperature is less than Tc the annealing time may be selected consistent with the annealing temperature, with shorter annealing times being appropriate for higher annealing temperatures and longer annealing times being required for lower annealing temperature, as is well known to those of skill in the art.

In some aspects, it may be preferred that the microstructure in the glass layer 20" be partially crystalline. A partially crystalline microstructure comprising isolated, discontinuous nanometer-sized or micrometer-sized crystalline regions surrounded by amorphous material has been demonstrated to exhibit higher ionic conductivity and better resistance to penetration than a like-dimensioned fully amorphous body. The requirement that the crystalline phase be discontinuous limits the maximum fraction, by volume, of crystalline phase to be less than 60% with volumes as low as 1% being feasibly achieved. In a preferred aspect, the volume fraction of crystalline material should range from 20% to 40%. The development of such a microstructure requires that the annealing temperature be increased to above $T_c$ for at least a brief period.

The development of crystalline regions will occur by a nucleation and growth process in which a plurality of nanometer-sized or micrometer-sized crystalline regions develop in the amorphous material and slowly grow until the entirety of the amorphous layer is transformed to a crystalline phase. It is preferred to develop the desired microstructure of nanometer-sized or micrometer-sized islands of crystalline phase encapsulated in a continuous amorphous matrix. Such a structure may be developed by selecting an annealing temperature which is above, but close to $T_c$, to limit the number of nuclei and hence increase their separation. An annealing temperature close to $T_c$ will also serve to reduce diffusion (relative to a higher annealing temperature) and so slow the growth of the crystalline regions enabling more flexibility in controlling of the process. Optionally, a multi(temperature)-zone furnace 28 may be employed to at least partially decouple the nucleation process from the growth process, for example by heating to above Tc before decreasing the temperature below Tc point for continued annealing to promote more controllable growth of the crystalline regions.

Figure 2A:
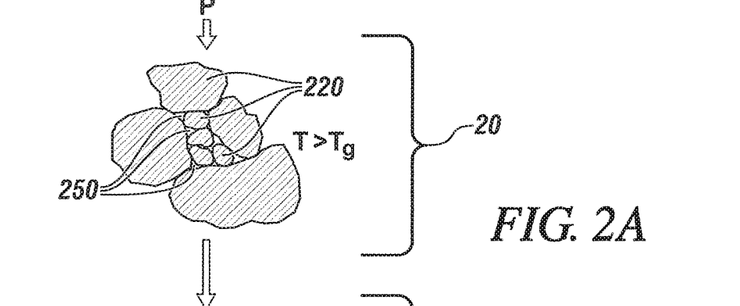
FIGS. 2A-C schematically illustrate the microstructural evolution experienced by a glassy powder compact during consolidation.
Figures 2B, 2C:
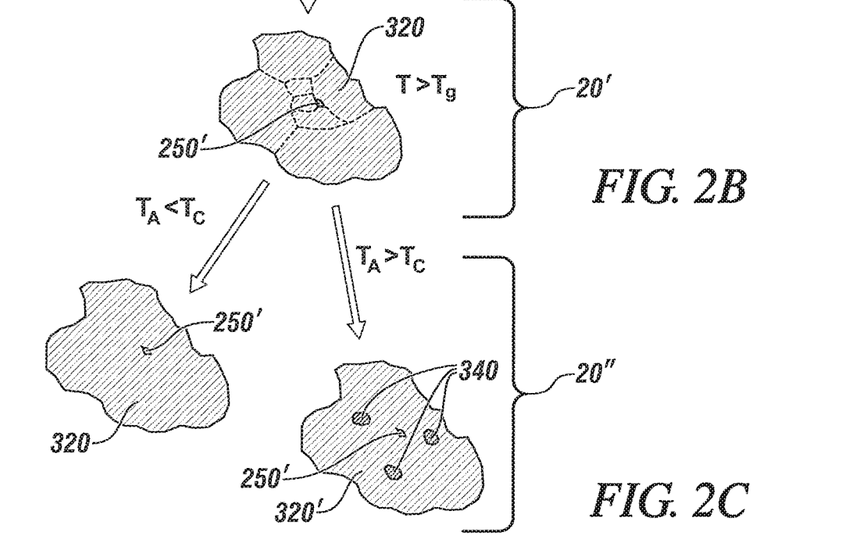
Figure 3:
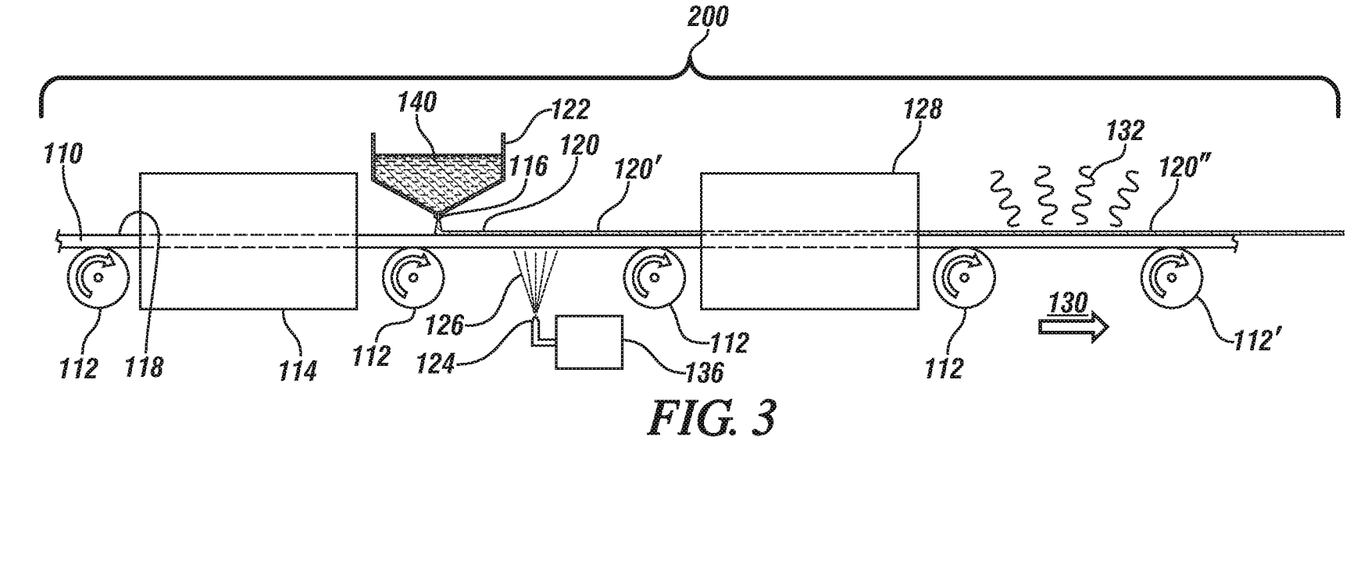
FIG. 3 illustrates a continuous or semi-continuous process for forming a thin layer of sulfide and oxy-sulfide glass film from a lithium-containing sulfide or oxy-sulfide melt.

The mechanical and thermal cycles to which the glass powder 20 is subjected are shown schematically at FIGS. 2A-C. At FIG. 2A, a portion of powder layer 20 is shown and comprises a plurality of layered glassy particles 220 of varying sizes separated by interparticle voids 250. The particles are maintained in close proximity by application of pressure P. On heating to a temperature greater than $T_g$, the glassy material will begin to exhibit macroscopic flow in response to pressure P. Also, some atom transport will occur through diffusion. The combination of macroscopic flow and diffusion, under the urging of applied pressure P will compact and consolidate the particles, eliminating many of the interparticle voids and consolidating the particles into amorphous or glassy body 320 incorporating remnant void 250' shown at FIG. 2B. For ease of comparing FIGS. 2A and 2B, the remnant internal particle boundaries are shown in as dashed lines in the interior of body 320, but, absent some surface contamination or other marker initially present on the particle surface the amorphous boundary regions will be indistinguishable from the amorphous particle interiors and so will not be identifiable.

FIG. 2C is illustrative of the two microstructures which may be developed during annealing. Note that in both cases remnant void 250' remaining after compaction is retained in the resulting microstructure. If the annealing temperature $T_A$ is chosen to be less than $T_c$ only stress relief will occur and body 320, although substantially stress-free will be, microstructurally, identical to body 320 at the end of the compaction step as shown at FIG. 2B. If, however, the annealing temperature $T_A$ is chosen to be greater than $T_c$ then not only will the stresses be relieved but small, irregularly-shaped, but generally equi-axed crystalline regions 340 will develop in body 320'. The size of these, generally equi-axed crystalline regions may be characterized by a characteristic dimension which may be the diameter of a sphere sufficient to circumscribe the crystalline region.

On exiting the annealing furnace 28 the layer 20" slowly cools, by radiation as indicated at 32 in FIG. 1, to room temperature or about 20-25° C. At this stage, the glassy layer may be removed from the substrate and processed appropriately to prepare it for use in an electrochemical cell. Since, the required processing temperatures are generally low to moderate, the smooth substrate surface 18 is not expected to react, bond to or otherwise engage with the glass layer. Thus, the glassy layer 20" may be readily separated from substrate portion surface 18 without introducing any deformation or damage to either the glassy layer 20" or of substrate portion surface 18. Thus, substrate portion surface 18 will, possibly absent some minor cleaning etc., be immediately available for re-use to enable the continued production of the continuous layer glassy layer 20".

It will be appreciated that the specific features of the above-described device are illustrative and not limiting. For example, the use of heated rollers to compact the powder and the relationships of the heating devices to the substrate portion is a consequence of the desire to operate the process continuously. However, the process may be conducted in batch mode where, for example, a suitable quantity of, optionally pre-heated, powder could be confined between the (optionally heated) platens of a press or other pressure-inducing device and heated until consolidated, then transferred to a local or remote oven and annealed to produce a discrete glass sheet generally conforming in size to the press platen dimensions. Alternatively, the entire press or like apparatus could be contained within an oven and the temperature adjusted appropriately for the particular process step. These and other alternative implementations of the above-described process steps are comprehended in the above disclosure.

The above process requires an initial lithium-containing (or sodium-containing) (oxy)sulfide glass precursor composition powder with an amorphous glassy microstructure.

Such a powder may be formed in several ways. One method is to combine suitable proportions of a glass-former constituent and a lithium-containing (or sodium-containing) glass-modifier constituent and heat them to form a melt. The melt may then be rapidly quenched, for example by melt spinning to form a ribbon or splat cooled to prepare flattened particles of 'bulk' amorphous solid.

The melting and quenching may also be conducted in a closed vessel or ampoule. This minimizes issues related to the reactivity and volatility of melts of these compositions. However, this approach limits the quench rate that may be achieved and limits the volume of material which may be rendered amorphous.

Ball milling may also serve to promote chemical interaction between the constituents nominally at room temperature obviating concerns over reaction with the atmosphere or selective volatilization. This procedure, generally known as mechanochemical milling, requires only bringing together the constituent glass-former and glass-modifier, which may be dispersed in an inert aprotic carrier liquid such as ethers, alkanes, possibly ketones or ester based liquids. More preferably, however, the precursors are dry milled in the absence of solvent. in a ball mill and continuing to mill these constituents until the reaction goes to completion and an appropriate particle size distribution is achieved.

All of the above approaches however are small throughput processes, and, even if several such processes were conducted in parallel, ill-suited for providing a continuous stream of glassy powder precursor to feed the continuous powder-based process described above. An approach to preparing, in a continuous or semi-continuous process a significant quantity of an amorphous glassy layer is shown in FIG. 3.

The process of FIG. 3 will be described as it may be practiced to form an ionic conductor layer, but, as will become apparent, minimal modification is required to render the process suitable for the preparation of feedstock suited for the practice of the above-described powder process.

Analogously to the powder compaction process shown at FIG. 1, the process shown at FIG. 3 illustrates a fabrication zone 200 though which passes a substrate portion 110 transported on rollers 112, 112' in a direction indicated by arrow 130. As before, substrate portion 110 may be a portion of a continuous belt which, at roller 112' loops under (not shown) the section shown and is carried in the direction from roller 112' to roller 112 until it loops upwardly (not shown) at roller 112 to again participate in the process. Alternatively, substrate 110 may be a portion of a large diameter annular disc which is supported and carried on radially oriented rollers 112 continually advancing in a single direction until a surface portion of substrate 110 completes a full revolution and returns to its starting point ready for re-use. It will be further appreciated that, in operation of such a continuous device there may be need for cleaning or surface treatment stations (not shown) to restore the substrate surface to a suitable condition for re-use.

Substrate portion 110 may be fabricated from a material which may be wetted by a glass melt without reacting or otherwise interacting with the melt. Since the melting point of typical glass compositions is about 700° C., only a limited number of suitable substrate materials may be used. Preferably substrate surface 118 is fabricated of quartz. If substrate portion 110 is a section of a belt as described above it cannot be fabricated of a continuous sheet of brittle quartz but must instead be fabricated of a series of pivotably attached plates arranged to flex and bend in a manner generally analogous to a tank tread or caterpillar track. In this arrangement, it may be more convenient to use metal 'plates' to form the 'tread' or 'track' with each 'tread' or 'track' carrying an individual, smooth-bottomed, flat-bottomed, shallow quartz dish rather than trying to achieve a smooth continuous quartz surface.

Substrate portion 110, on entering fabrication zone 200 first enters a heating zone 114 which may comprise a furnace or other heating device adapted to heat the substrate to temperature at or slightly above the melt temperature of the glass melt. Typically, this may be between 650° C. and 1000° C. On continued advance of substrate portion 110 it receives, from dispensing device 122 through nozzle 116, a flow of the liquid glass melt 140. Although only a single dispenser 122 and nozzle 116 are shown, it may be appropriate to employ multiple nozzles 116 fed by a single dispenser 122 or to employ a plurality of nozzles 116 each fed by a dedicated dispenser 122 to more uniformly coat the substrate surface 118. Because the melt compositions are reactive and volatile as described previously the liquid should be maintained under a 0.1-1 MPa overpressure of non-reactive gas such as vaporized sulfur, phosphorus and/ or inert gas such as argon such that partial equilibrium vapor pressures of the more volatile species in the glass melt is less than the over pressure provided to minimize contamination and achieve consistency of composition. It may be appropriate to at least partially enclose (enclosure, or the like, not shown) that portion of the process involving liquid melt to facilitate atmosphere control. To limit the extent of, or need for, such atmosphere control, dispenser nozzle 116 should be positioned as close as possible to substrate surface 118, and coolant spray nozzle 124, which serves to cool and solidify the melt (described further below), should be placed as close as possible to where the melt is dispensed from nozzle 116.

Because the glass melt wets the substrate portion surface 118 the glass melt spreads over substrate surface 118 to produce a thin, substantially uniform, layer of melt 120 supported by substrate 110. As noted earlier, the glass composition will affect the fluidity of the glass melt. Since the spreading of the liquid melt will be influenced by the viscosity of the melt, the choice of glass composition may be informed by a requirement for a preferred fluidity range, generally a range which promotes the rapid distribution and levelling of the melt. The thickness of the melt may be adjusted by adjusting the volume flow rate of melt onto the substrate. Generally, it is preferred that the melt thickness range from 10 micrometers to 200 micrometers.

Further advance of substrate portion 10 will expose the underside of substrate portion 110 to coolant 126 applied through spray nozzle 124. Coolant 126, which, before dispensing, may be passed through a cooler (not shown) to increase its effectiveness, may be drawn from storage unit 136 as shown, or from some other suitable source, including a municipal water supply. Coolant 126 is applied at a flow rate sufficient to rapidly extract heat locally from substrate portion 110 so that liquid melt 120 is cooled by conduction through its contact with substrate portion 110 at a rate sufficient to suppress crystallization and render a glassy or amorphous solid glass layer 120'.

The aggressive cooling applied to liquid melt 120 may result in non-uniform cooling of liquid melt 120 and possibly induce residual stresses in solid glass layer 120'. Residual stresses may also be induced by differences in the thermal expansion coefficient of the glass layer 120' and the supporting quartz substrate portion 110. Thus, continued advance of substrate portion 10 carries the substrate portion and its supported solid glass layer 20' into a furnace, oven or other suitable heating device 28 where the solid glass layer may be raised to an elevated temperature for a time suitable to relax and relieve the residual stresses to render a substantially stress-free solid glass layer 20" at the furnace 28 exit.

The temperature of the furnace 28 and the annealing temperature to which solid glass layer 20' is subjected should be sufficiently high to promote stress relaxation in a reasonable time. As before, the annealing temperature may be selected to render either an amorphous, glassy layer or a layer comprising discontinuous nanometer-sized or micrometer-sized crystalline regions. A suitable annealing temperature will depend on the glass composition, but, by way of illustration and not limitation, an annealing temperature of between about 220° C. and 320° C. is appropriate for some ranges of glass compositions because many they exhibit crystallization temperatures of 270-370° C.

On exiting the annealing furnace 128 the layer 120" slowly cools, by radiation as indicated at 132, to room temperature or about 20-25° C. At this stage, the glassy layer may be removed from the substrate and processed appropriately to prepare it for use in an electrochemical cell. Since, as noted earlier, the substrate surface 118 is particularly selected not to react with the glass melt it is expected that no appreciable deformation of the layer or damage to the substrate surface 118 will occur on separation and that substrate portion surface 118 will, possibly absent sonic minor cleaning etc., be immediately available for re-use.

If it is intended to operate this process to prepare 'bulk' glassy material for subsequent pulverization to power and use in the powder-based solid electrolyte production process of FIG. 1 some modifications may be made to the melt-based process of FIG. 3. First, the thickness of the dispensed liquid layer may be increased to up to 10,000 micrometers while still achieving a quench rate satisfactory to render the melt amorphous. Second, any annealing should be conducted below $T_c$ so maintain the final microstructure as amorphous. Third, it may be possible to eliminate the annealing step entirely. By eliminating the annealing step the quenched structure may possess sufficiently high residual stress(es) that it will spontaneously fragment. Such fragmentation, since the glassy material is to be pulverized, is perfectly suitable for its intended process, but may create handling or cleaning issues which minimize or obviate any energy advantage gained by eliminating the annealing step.

The above description of exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of forming a solid-state electrolyte layer for face-to-face engagement with an alkali metal anode in an electrochemical cell, the alkali metal being one of lithium or sodium, the method comprising:
applying a layer of a glassy powder precursor on a flat surface of a substrate material layer that is not chemically reactive with the glassy powder precursor, the glassy powder precursor having been made by melting a mixture comprising: (i) a glass former comprising a glass-forming sulfide or oxide and (ii) a glass modifier comprising an alkali metal-containing sulfide or oxide, at least one of the glass former and glass modifier comprising a sulfide or oxy-sulfide, cooling the melted mixture to form a glassy precursor, and pulverizing the glassy precursor to form the glassy powder precursor;
heating the layer of the glassy powder precursor to form a solid amorphous layer of a glassy composition comprising an alkali metal, and a sulfide or oxy-sulfide, the solid amorphous layer being of substantially uniform thickness, having a predetermined planar shape and dimensions, and having a porosity of up to 15% by volume, the heating being performed at a temperature of at least about 100° C. below the temperature at which the solid amorphous layer will crystallize;
heating the solid amorphous layer on the substrate at a temperature greater than the glass transition temperature and less than the temperature at which the solid amorphous layer will crystallize and for a time sufficient to remove residual stress in the layer and to form an annealed, flexible, uniformly amorphous microstructure, or heating the solid amorphous layer on the substrate at a temperature greater than the temperature at which the solid amorphous layer will crystallize and for a time sufficient to remove residual stress in the layer and to form a microstructure characterized by recrystallized regions isolated in an amorphous matrix, the annealed layer having a smooth surface engaging the substrate and a smooth surface opposite the substrate;
cooling the annealed layer to an ambient room temperature on the substrate; and
removing the cooled annealed layer from the surface of the substrate to provide the solid-state electrolyte layer, the thickness of the solid amorphous layer enabling the thickness of the solid-state electrolyte layer to be in the range of ten micrometers to two hundred micrometers, wherein the solid-state electrolyte layer comprises a glass or a glass ceramic that conducts alkali metal ions and, when in face-to-face engagement with an alkali metal anode, is resistant to penetration of dendrites formed on the surface of the alkali metal anode.

2. The method according to claim 1, wherein the alkali metal is lithium and the glass modifier is dilithium sulfide.

3. The method according to claim 1, further comprising: cutting the solid-state electrolyte layer to a size suitable for application in a battery or cell.

4. The method according to claim 1, further comprising: placing the solid-state electrolyte layer against an alkali metal anode in a battery or cell.

5. The method according to claim 1, wherein the glass former is selected from the group consisting of $P_2S_5$, $SiS_2$, $GeS_2$, $SnS_2$, $As_2S_3$, and combinations thereof.

6. The method according to claim 5, wherein the mixture further comprises a glass co-former selected from the group consisting of $P_2O_5$, $B_2O_3$, $SiO_2$, $Al_2O_3$, and combinations thereof.

7. The method according to claim 6, wherein the glass modifier comprises $Li_2S$, $Na_2S$, $Li_2O$, $Na_2O$, or combinations thereof.

8. The method according to claim 7, wherein the glass modifier comprises $Li_2O$ or $Na_2O$.

9. The method according to claim 1, wherein the glass modifier comprises $Li_2O$ or $Na_2O$.

10. A method of forming a solid-state electrolyte for face-to-face engagement with an alkali metal anode in an electrochemical cell, the alkali metal being one of lithium or sodium, the method comprising:
applying to a suitable substrate a generally uniform layer of particles comprising an amorphous, glassy solid composition formed by melting a mixture comprising a glass former comprising a glass-forming sulfide, or oxide and a glass modifier comprising an alkali metal-containing sulfide or oxide, at least one of the glass former and glass modifier containing a sulfide or oxy-sulfide, cooling the melted mixture to form a glassy precursor, and pulverizing the glassy precursor to form the particles;
heating the layer of particles to a predetermined temperature less than the temperature at which the amorphous, glassy solid composition recrystallizes;
applying a pressure to the heated layer of particles for a predetermined time, the predetermined time and pressure being sufficient to consolidate and compact the particles into a solid layer on the substrate, the solid layer having a porosity of up to 15% by volume;
annealing the solid layer at a second predetermined temperature greater than the glass transition temperature and less than the temperature at which the amorphous solid recrystallizes but sufficient to relieve any stresses introduced into the layer by the consolidation operation stresses while retaining the solid in an amorphous state, or, optionally, at a second predetermined temperature sufficient to partially crystallize the solid layer; and cooling the annealed solid layer to room temperature to form the solid-state electrolyte.

11. The method according to claim 10, wherein the alkali metal is lithium and the alkali metal-containing sulfide is dilithium sulfide.

12. The method according to claim 10 wherein the particles range in size up to twenty micrometers.

13. The method according to claim 10, wherein the applying the pressure comprises compacting the heated layer of particles through one or more sets of opposed rollers or of opposed heated rollers.

14. The method according to claim 10, wherein the substrate is a layer of quartz.

15. The method according to claim 10, wherein less than forty percent by volume of the amorphous, glassy solid composition is crystallized.

16. The method according to claim 10, wherein the annealed solid layer contains a plurality of dispersed crystallized regions distributed in an amorphous matrix.

17. The method according to claim 16, wherein the crystallized regions have a characteristic dimension of five micrometers or less.

18. The method according to claim 10, wherein the glass former comprises $P_2S_5$, $SiS_2$, $GeS_2$, $SnS_2$, $P_2O_5$, $B_2O_3$, $SiO_2$, $Al_2O_3$, or combinations thereof.

19. The method according to claim 18, wherein the glass modifier comprises $Li_2S$, $Na_2S$, $Li_2O$, $Na_2O$, or combinations thereof.

20. The method according to claim 10, wherein the glass modifier comprises $Li_2O$ or $Na_2O$.

* * * * *